3,623,896
Patented Nov. 30, 1971

3,623,896
MARINE ANTIFOULANT WITH COPPER, COBALT
OR MANGANESE TEREPHTHALATE
Hans A. Leipold, Chicago, Ill., assignor to Standard
Oil Company, Chicago, Ill.
No Drawing. Filed June 15, 1967, Ser. No. 646,203
Int. Cl. C09d 5/14
U.S. Cl. 106—15                     1 Claim

ABSTRACT OF THE DISCLOSURE

Compositions of matter including cobalt, copper, and maganese salts of terephthalic acid, the cobalt, copper, and manganese having a valence of two for use as marine antifoulants.

BACKGROUND OF THE INVENTION

The crustaceous formations deposited on surfaces subjected directly to sea water has long been a severe problem in many industries. The formation and deposition of such forms as barnacles, encrusting bryozoans, algae, bugula, hydroids, oysters, tube worms, tunicates, among others, including microorganism slime film on the surfaces of materials subjected directly to sea water, causes much of the problem mentioned above. Many methods have been devised to eliminate the depositions of many of the materials of life from the sea. Probably the most effective method for preventing the continued surface deposition of these various forms of sea life has been by manually scraping the surfaces to remove the deposits.

Slime increases the surface friction, although only to a very limited extent. Bacterial slimes settle first on the hull, followed later by diatom slimes. Weed is often referred to as "grass" and various forms occurs—green, brown and red—all of which require daylight for their growth. Green weed requires more light than brown, and brown more than red. Hydroids (commonly known as "whiskers") belong to the animal group; in form they are whiskery and branchlike. For this reason they are sometimes mistaken for weed growth. Shell fouling includes acorn and goose neck barnacles, tube worms, mussels and oysters. Acorn barnacles of various species are commonest, followed by tube worms. Miscellaneous fouling includes simple ascidians usually called "jellybags" or "sea squirts," colonial ascidians, sponges, polyzoa and marine borers. Marine borers such as gribble and teredo can do much damage to unprotected wooden hulls, but do not attack metal surfaces.

It is known that fouling organisms cannot settle on an underwater surface if the rate of water flowing past it exceeds 2 knots. However, once they become attached, even a high rate of flow will not remove them. They must be prevented from settling in their embryo or larval state since, once attached, they cannot be killed by the antifouling, although their growth may be stunted.

Because the deposition from sea water of formations characteristic thereof creates such a major problem throughout so many industries, practically any approach yielding any contribution to the solution of the problem is welcomed. Defense units of the Federal Government have expended millions of dollars in an attempt to develop means and methods for combating and preventing the build up of marine life on the hulls of ships which are directly subjected to sea water. Paints and other coatings have been developed which assist in the prevention of the formation of marine life.

Applicant has found a plurality of compositions which prevent the fouling of surfaces subjected directly to sea water. The invention provides a simple method for preventing the growth of formations of marine foulants on surfaces. The invention provides that the compositions may be mixed with coatings which can be applied to the surfaces of almost any material that might be subjected directly to sea water. The invention further provides that the novel compositions may be mixed with the constituent forming the material having the surface subjected to sea water, thus making the novel compositions a part of that material and that surface.

SUMMARY OF THE INVENTION

It has been discovered that when the heavy metal salts of terephthalic acid are incorporated in surface coatings of materials whose surfaces are directly subjected to sea water a marine anti-foulant composition results. It has also been discovered that in certain composition compatible materials the incorporation of the anti-foulant compositions during the manufacture of these materials produces a marine anti-foulant. The heavy metal salts of terephthalic acid selected from the group of cobalt, copper, and manganese, produce the surprising and superior marine antifoulant properties.

PREPARATION OF METALLIC TEREPHTHALATE COMPLEXES

The heavy metal complexes of terephthalic acid described and claimed herein were prepared by the following general method. A neutralized aqueous solution of sodium terephthalate prepared with acid was added to an aqeuous solution of the appropriate metallic sulphate. Upon thorough blending, fine crystalline product formed rapidly. The reaction product precipitates from the solution in several seconds except for cobalt terephthalate which formed slowly and precipitated from the solution over about a two-week period. The products were isolated by filtration, and the filter cakes were washed with water before drying in vacuum ovens overnight at a temperature of about 90–100° C. under a pressure of about 20–21 inches of mercury in the presence of a slight air bleed. Except where noted the products were submitted directly for analysis without purification. The results are amplified below.

The cobalt containing salt of terephthalic acid was produced by reacting about 168 grams of $CoSO_4 \cdot 7H_2O$ and about 63 grams of $Na_2TA$. After about two weeks of precipitation the product yield measured about 37.8 grams. The calculated analysis for $Co(C_8H_4O_4) \cdot 2H_2O$ is as follows: C, 37.1; H, 3.1; and Co, 22.7. The product was pink in color and was found to contain the following: C, 36.4; H, 3.2; and Co, 22.0. The infrared adsorption showed a symmetrical axial stretching mode for the carboxyl group of about 6.48 wavelengths (v.s. and w.) along with an unsymmetrical axial stretching mode of about 7.23 wavelengths (v.s.).

About 150 grams of $CuSO_4 \cdot 5H_2O$ and about 63 grams of $Na_2TA$ were reacted and yielded about 64 grams. The product was slurried in boiling water for several minutes prior to filtration after which the filtered cake was dried. The calculated constituents for $Cu(C_8H_4O_4) \cdot 2H_2O$ is as follows: C, 36.4; H, 3.1; and Cu, 24.1. The product was pale blue in color and was found to contain the following: C, 37.3; H, 3.1; Cu, 23.7. The infrared adsorption showed a symmetrical carboxyl group with an axial stretching mode of about 7.3 wavelengths (m.) or 6.54 wavelengths (v.s.) and an unsymmetrical stretching mode of about 7.15 wavelengths (v.s.).

About 102 grams of $MnSO_4 \cdot H_2O$ and about 63 grams of $Na_2TA$ were reacted in accordance with the preparation described above and the yield was about 64 grams. The calculated analysis for $Mn(C_8H_4O_4) \cdot 2H_2O$ is as follows: C, 36.9; H, 3.1; and Mn, 23.9. The material was very pale pink in color and the constituents found were as follows: C, 37.9; H, 3.2; and Mn, 20.9. The infrared adsorption of the carboxyl group had a symmetrical stretching mode of about 6.43 wavelengths and an unsymmetrical stretching mode of about 7.20 wavelengths.

PROPERTIES OF METALLIC TEREPHTHALATE COMPLEXES

The novel heavy metal complexes of terephthalic acid described and claimed herein exhibit desirable marine anti-foulant properties and high insolubility in water as well as high insolubility in other mediums. The substantially insoluble complexes when present in other mediums provide the mechanism which allows dispersability of the complexes within the mediums without the loss of the desirable anti-foulant properties. As a result of the highly insoluble nature of these complexes, they can be dispersed within the materials, such as, fiberglass, plastics, etc., during manufacture.

Table I below shows the properties of cobalt, copper, and manganese terephthalate complexes wherein each of the metals has a valence of two.

TESTS OF METALLIC TEREPHTHALATE COMPLEXES

The novel heavy metal complexes of terephthalic acid described and claimed herein were tested over extended periods of time in the manner described below.

Samples of cobalt, copper, and manganese salts of terephthalic acid were prepared in accordance with the preparations described above. The materials were impregnated into porous carbon blacks which were immersed in the ocean for extended periods of time. The carbon blocks measured about 2½" x 2½" x 3/16" and had a porosity of about 20%. Each of the heavy metal salts of terephthalic acid was finely ground and dispersed in an organic liquid carrier such as xylol. Each carbon block was subjected to the xylol by immersion and then subjected to the xylol containing the dispersed complex. To assure migration of the dispersed anti-foulant into the porous block, the block after subjection to the xylol containing

TABLE I.—PROPERTIES OF METALLIC TEREPHTHALATE COMPLEXES

| Metal | Percent metal | Water | Methanol | Acetone | DMF | Pyridine | n-Hexane | Benzene | p-Xylene |
|---|---|---|---|---|---|---|---|---|---|
| Co | 22.0 | i | i | i | i | i | i | i | i |
| Cu | 23.7 | i | i | i | i | i | i | i | i |
| Mn | 20.9 | i | i | i | i | i | i | i | i |

It is apparent from the properties shown by the results of Table I that the terephthalate complexes of cobalt, copper, and manganese, have significantly high insolubilities in water as well as in the above enumerated conventional solvents. The desirable substantially insoluble properties of the complexes were also exhibited in two mediums each having about equal volumes of water and dimethylformamide, and water and pyridine. Throughout Table I solubility is defined as (i) where (i) is much less than 0.8 gram per hundred grams of solvent at room temperature.

the dispersed complex was placed in an ultrasonic cleaner. Subsequently, the xylol was evaporated leaving the complex salt of terephthalic acid deposited within the pores and on the surface of the carbon block.

Carbon blocks having the cobalt, copper, and manganese salts of terephthalic acid impregnated therein along with blanks and blocks having the conventional bis(tri-n-butyltin) oxide (TBTO) as a reference were used in order to obtain the performance data of Table II below.

TABLE II.—PERFORMANCE OF ANTI-FOULANTS

| | Fouling on surface (*) | | | | | | | | |
|---|---|---|---|---|---|---|---|---|---|
| | Barn. (1) | E.B. (2) | Al. (3) | Bug. (4) | Hyd. (5) | Oy. (6) | T.W. (7) | Tun. (8) | Slime (9) |
| Mn: | | | | | | | | | |
| 1 month | | | | | 1% | | | 1% | |
| 2 months | | | | | 1% | | | 1% | |
| 3 months | | | | | 2% | 2 | | 2% | |
| 4 months | More than 50% fouled; removed from test | | | | | | | | |
| Co: | | | | | | | | | |
| 1 month | | | | | 1% | | | 2% | |
| 2 months | | | | | 1% | | | 1% | |
| 3 months | | 2% | | | 1% | 2 | 1 | 2% | |
| 4 months | More than 50% fouled; removed from test | | | | | | | | |
| Cu: | | | | | | | | | |
| 1 month | | | 1% | | | | | | |
| 2 months | | | 7% | 1% | | | | | |
| 3 months | 6 | 7% | 7% | 1% | | | | | |
| 4 months | More than 50% fouled; removed from test | | | | | | | | |
| Bis: | | | | | | | | | |
| 1 month | | | | | | | | | |
| 2 months | | | 2% | | | | | | |
| 3 months | 6 | 1% | 35% | | | | | | |
| 4 months | More than 50% fouled; removed from test | | | | | | | | |
| Blank: | | | | | | | | | |
| 1 month | More than 50% fouled; removed from test | | | | | | | | |
| 2 months | | | | | | | | | |
| 3 months | | | | | | | | | |
| 4 months | | | | | | | | | |

\* Number of solitary forms, or percent surfaces covered by colonial forms.
1 Barnacles.
2 Encrusting Bryozoans.
3 Algae.
4 Bugula.
5 Hydroids.
6 Oysters.
7 Tube worms.
8 Tunicates.
9 Microorganism slime film.
NOTE: Leader (__) indicates organism not present on surface.

It is apparent from the data portrayed in Table II that the performance of the terephthalate complexes is superior to the conventional marine anti-foulant material (TBTO). Furthermore, it is contemplated that combinations of the instant terephthalate complexes may be used to obtain the desirable performance that such combinations would yield. Table III below portrays an integrated comparison of results of the instant novel complexes of this invention as compared to the conventional marine anti-foulant compound (TBTO).

TABLE III.—ANTI-FOULANT ACTIVITY—TEREPHTHALATE COMPLEXES VS. TBTO

| Compound: | Conc. (mg.) | Algae, 3 mos. (percent) | Total fouling, 3 mos. (percent) |
|---|---|---|---|
| TBTO | 33 | 35 | 42 |
| Cu | 62 | 7 | 21 |
| Co | 50 | 0 | 6 |
| Mn | 62 | 0 | 8 |

In addition to the favorable anti-foulant activity of the terephthalate complexes, the relative costs of the cobalt, copper, and manganese complex salts of terephthalic acid are realistically estimated to be about one-third to one-quarter of the cost of the conventional marine anti-foulant material (TBTO) used as a reference herein.

Within the purview of this invention the instant novel compositions showing surprising and superior marine anti-foulant properties and significant insolubilities may be utilized separately in coatings or dispersed within the material subjected to sea water or in any combination in coatings or in the materials. This invention has been described in relation to the preferred embodiments and many details have been set forth for the purpose of illustration; however, it is apparent to those skilled in the art that the invention is susceptible to other embodiments and that many of the details set forth herein can be varied considerably without departing from the basic principles of this invention.

Having described the invention, what is claimed is:

1. A marine antifoulant composition comprising (a) a coating suitable for application to a surface which is subjected to direct contact with sea water, and (b) dispersed in said coating, the cobalt or manganese salt of terephthalic acid, said salt being present in an amount sufficient to substantially inhibit the accumulation of foulants on the surface being coated with said composition.

References Cited

UNITED STATES PATENTS

| | | | |
|---|---|---|---|
| 2,999,837 | 9/1961 | Franzus | 260—45.75 CU |
| 3,266,913 | 8/1966 | Hardy et al. | 260—45.75 CU |
| 3,371,063 | 2/1968 | Girard | 260—45.75 CU |
| 3,413,399 | 11/1968 | Wehner | 424—131 |
| 3,426,473 | 2/1969 | Cardarelli et al. | 106—15 AF |
| 2,381,852 | 8/1945 | Hochwalt | 106—15 AF |
| 2,698,865 | 1/1955 | Katzschmann | 260—524 |
| 2,798,816 | 7/1957 | Knappwost | 106—15 AF |
| 3,395,530 | 8/1968 | Campbell | 106—15 AF |
| 2,901,393 | 8/1959 | Magner | 424—294 |

JULIUS FROME, Primary Examiner

A. H. KOECKERT, Assistant Examiner

U.S. Cl. X.R.

117—113, 121, 226; 424—287, 294, 295